(12) United States Patent
Thomas et al.

(10) Patent No.: US 8,559,295 B2
(45) Date of Patent: Oct. 15, 2013

(54) METHOD AND APPARATUS FOR PILOT SIGNAL TRANSMISSION

(75) Inventors: Timothy A. Thomas, Palatine, IL (US); Kevin L. Baum, Rolling Meadows, IL (US); Brian K. Classon, Palatine, IL (US); Vijay Nangia, Algonquin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1808 days.

(21) Appl. No.: 11/419,797

(22) Filed: May 23, 2006

(65) Prior Publication Data

US 2007/0036066 A1 Feb. 15, 2007

Related U.S. Application Data

(60) Provisional application No. 60/708,234, filed on Aug. 15, 2005.

(51) Int. Cl.
*H04J 11/00* (2006.01)
*H04B 3/10* (2006.01)

(52) U.S. Cl.
USPC .......................................... 370/208; 370/491

(58) Field of Classification Search
USPC .......... 370/204, 206, 208, 491; 375/267, 296, 375/362
See application file for complete search history.

(56) References Cited

U.S. PATENT DOCUMENTS

| | | | |
|---|---|---|---|
| 6,069,884 A | 5/2000 | Hayashi et al. | |
| 6,473,467 B1 * | 10/2002 | Wallace et al. | 375/267 |
| 7,251,291 B1 * | 7/2007 | Dubuc et al. | 375/296 |
| 7,463,577 B2 | 12/2008 | Sudo et al. | |
| 2003/0072254 A1 | 4/2003 | Ma et al. | |
| 2003/0128678 A1 | 7/2003 | Subrahmanya et al. | |
| 2004/0081073 A1 | 4/2004 | Walton et al. | |
| 2004/0085939 A1 | 5/2004 | Wallace et al. | |
| 2007/0280394 A1 * | 12/2007 | Fung et al. | 375/362 |
| 2008/0253279 A1 * | 10/2008 | Ma et al. | 370/206 |

FOREIGN PATENT DOCUMENTS

| | | |
|---|---|---|
| JP | 200480110 | 3/2004 |
| WO | 2004056022 A2 | 7/2004 |
| WO | 2006019711 A1 | 2/2006 |

OTHER PUBLICATIONS

Y. Li, "Pilot-Symbol_Aided Channel Estimation for OFDM in Wireless Systems", IEEE Transactions on Vehicular Technology, vol. 49, No. 4, Jul. 2000.
S. Alamouti, "A Simple Transmit Diversity Technique for Wireless Communications", IEEE Journal on Select Areas in Communications, vol. 16, No. 8, Oct. 1998.
3GPP, R1-050387, Texas Instruments, "EUTRA Downlink Multiple Access Study."
3GPP TR 25.814 V0.1.1 (Jun. 2005), "Physical Layer Aspects for Evolved UTRA."
3GPP, R1-050396, Motorola, EUTRA Downlink Numerology and Design.

(Continued)

*Primary Examiner* — Mark Rinehart
*Assistant Examiner* — Gbemileke Onamuti

(57) ABSTRACT

A pilot transmission scheme is presented where during a first OFDM symbol period a first pilot sequence is transmitted over a first multiple sub-carriers on a first group of antennas. During a second OFDM symbol period, a second pilot sequence is transmitted over a second multiple sub-carriers on a second group of antennas. The first and the second groups of antennas only transmit one pilot sequence every subframe of M OFDM symbol periods.

19 Claims, 9 Drawing Sheets

(56) References Cited

OTHER PUBLICATIONS

3GPP TR 25.913 v2.10 (May 2005), "Requirements for Evolved UTRA and UTRAN."

F. W. Vook, T. A. Thomas, "MMSE Multi-User Channel Estimation for Broadband Wireless Communications," IEEE Globecom-2001, San Antonio TX, Nov. 26-29, 2001.

Y. Li, L.J. Cimini, and N.R. Sollenberger, "Robust Channel Estimation for OFDM Systems with Rapid Dispersive Fading Channels," IEEE Transactions on Communications, vol. 46, No. 7, Jul. 1998.

F. W. Vook and T. A. Thomas, "Transmit Diversity Schemes for Broadband Mobile Communication Systems," Proc. IEEE VTC-2000/Fall, Sep. 2000.

B. Steiner, "Time Domain Channel Estimation in Multi-carrier-CDMA Mobile Radio System Concepts," in Multi-Carrier Spread-Spectrum, pp. 153-160, Kluwer Academic Publishers, 1997.

Jacqueline A. Whitfield, "PCT/US2006/025583—PCT International Search Report and Written Opinion," WIPO, ISA/US, Commissioner for Patents, Alexandria, VA, USA, Mar. 15, 2007.

Nora Lindner, "PCT/US2006/025583—PCT International Preliminary Report on Patentability," The International Bureau of WIPO, Geneva, Switzerland, Feb. 28, 2008.

KIPO, "Notice of Preliminary Rejection (English Translation)," Korean Intellectual Property Office, Daejeon, Republic of Korea, Apr. 21, 2009.

Supplementary European Search Report, European Patent Office, The Hague, Nov. 12, 2012.

Motorola: "EUTRA Downlink Pilot Requirements and Design", 3GPP TSG RAN WG1 #42, R1-050714, London, U.K., Aug. 29-Sep. 2, 2006, all pages.

* cited by examiner

100

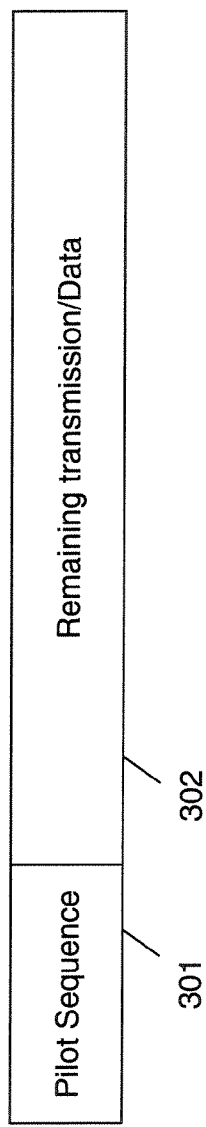
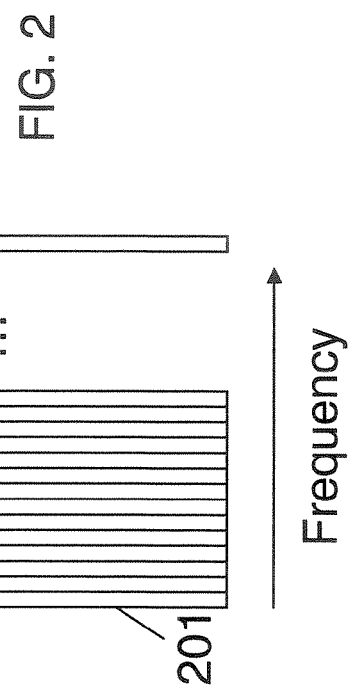

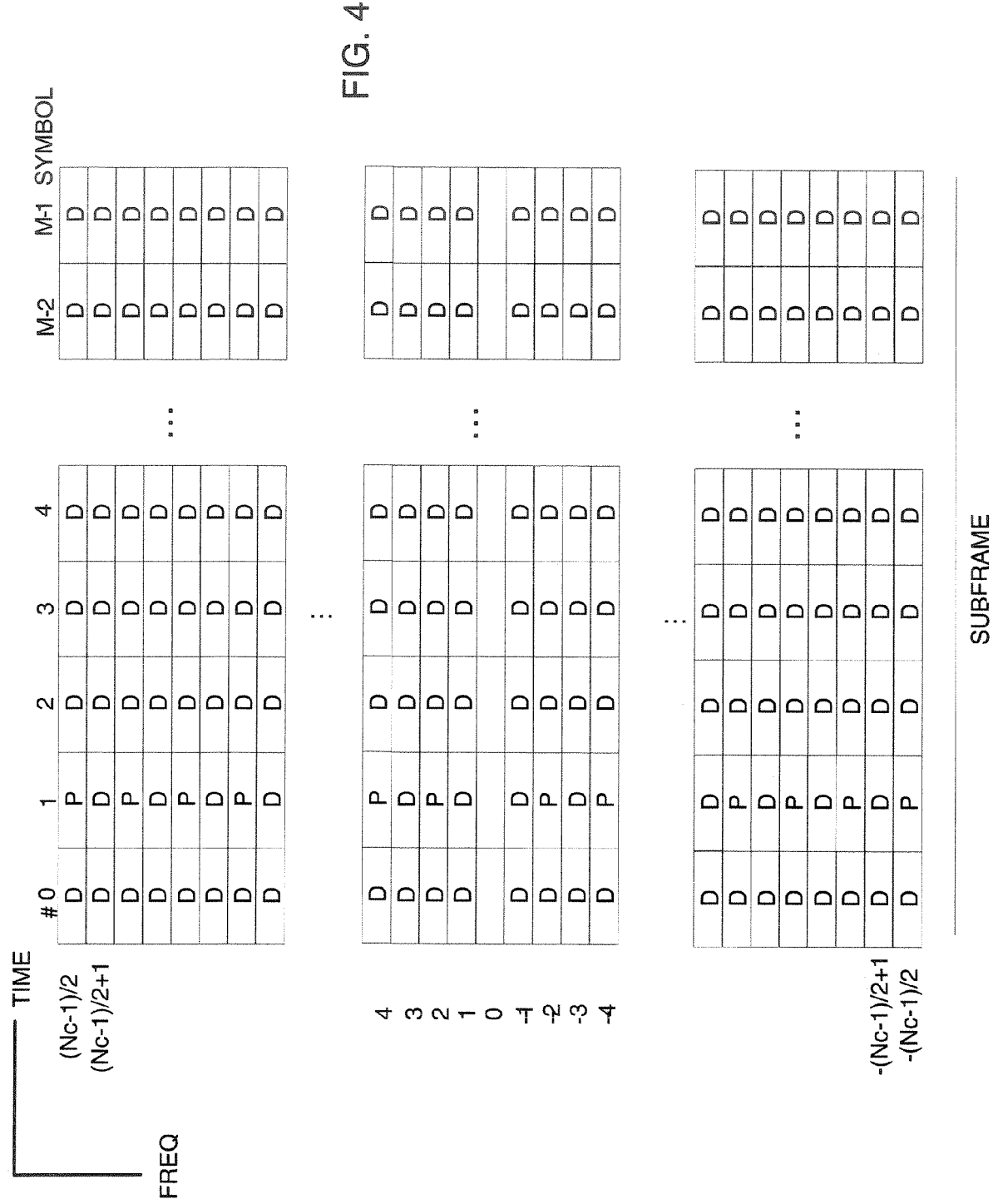

METHOD AND APPARATUS FOR PILOT SIGNAL TRANSMISSION

RELATED APPLICATIONS

The present application claims priority to U.S. Provisional Application No. 60/708,234, filed Aug. 15, 2005.

FIELD OF THE INVENTION

The present invention relates generally to pilot signal transmission, and in particular to a method and apparatus for pilot signal transmission in a communication system.

BACKGROUND OF THE INVENTION

A pilot signal, preamble, or reference signal are commonly used for communication systems to enable the receiver to perform a number of critical functions, including but not limited to, the acquisition and tracking of timing and frequency synchronization, the estimation and tracking of desired channels for subsequent demodulation and decoding of information data, the estimation and monitoring of the characteristics of other channels for handoff, interference suppression, etc. Several pilot schemes can be utilized by communication systems, and typically comprise the transmission of a known sequence at known time intervals. A receiver, knowing the sequence only or knowing the sequence and time interval in advance, utilizes this information to perform the abovementioned functions.

A typical pilot format used in earlier orthogonal frequency division multiplexed (OFDM) systems is a "scattered pilot" format with pilots distributed in both time and frequency based on the expected maximum Doppler frequency and maximum delay spread, respectively. Scattered pilots might be viewed as the most general pilot format, but they are fairly difficult to specify. For example, it is less clear how to support a varying number of transmit antennas, how to optimize for low user speeds but allow insertion of additional pilots for high speeds, and how to avoid scattered pilot edge effects. Channel estimation is also in general more difficult because of the varied pilot locations in the frame and the sub-frame boundaries. For example, some simpler channel estimation techniques might not be available and more sets of interpolation filters may be necessary. In addition to being more complex, scattered pilots also consume power while decoding the control channel, even if there is no data for the receiver. Therefore, a need exists for a method and apparatus for pilot signal transmission in a communication system that alleviates the above-mentioned problems.

BRIEF DESCRIPTION OF THE DRAWINGS

FIG. 2 illustrates division of a wideband channel into many narrow frequency bands (sub-carriers).

FIG. 3 illustrates pilot signal transmission for the communication system of FIG. 1.

FIG. 4 is a detailed view of a pilot format design.

DETAILED DESCRIPTION OF THE DRAWINGS

Figure 1:
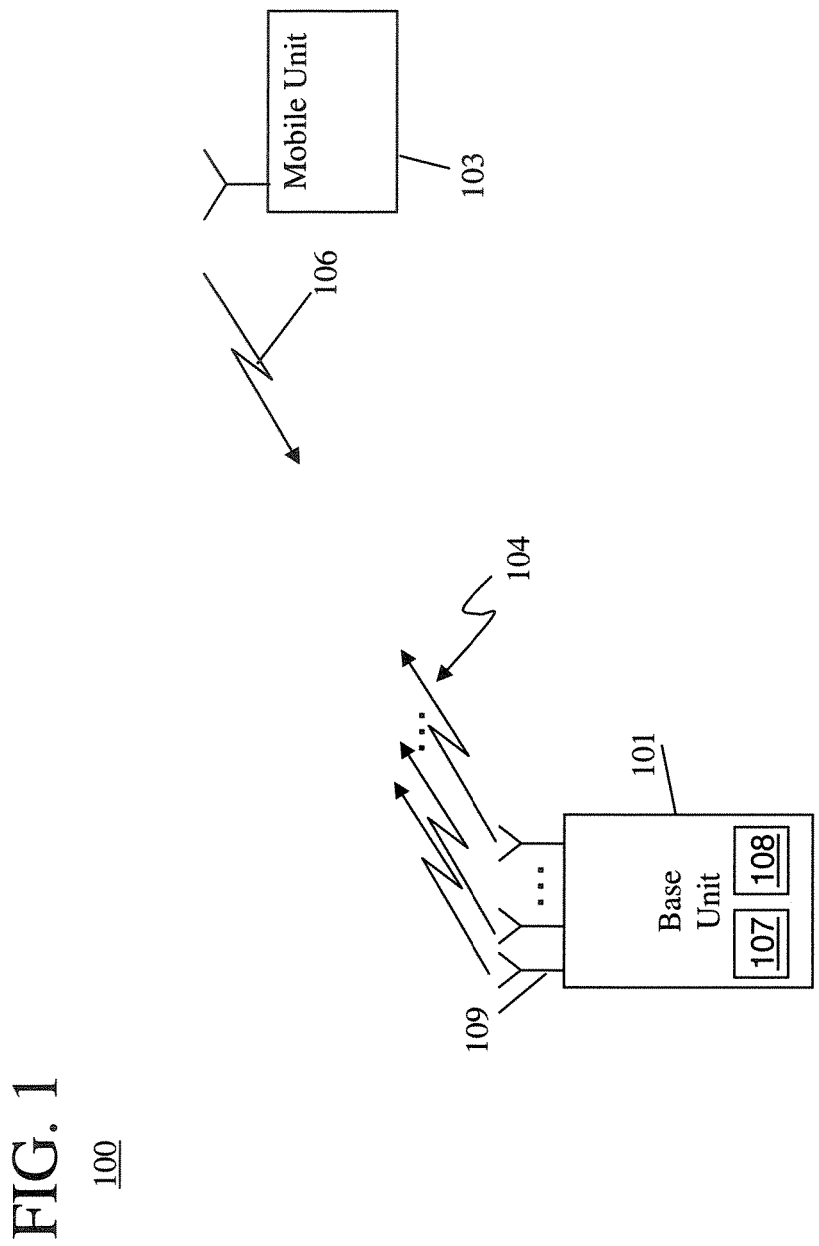
FIG. 1 is a block diagram of a communication system.

To address the above-mentioned need, a method and apparatus for pilot signal transmission is disclosed herein. In particular, a base unit transmits known sequences at known time intervals as part of their downlink transmissions. A remote unit, knowing the sequence and time interval, utilizes this information in demodulating/decoding the transmissions. A pilot scheme is utilized where during a first OFDM symbol period a first pilot sequence is transmitted over multiple sub-carriers on a first group of antennas. During a second OFDM symbol period, a second pilot sequence is transmitted over multiple sub-carriers on a second group of antennas. The first and the second groups of antennas only transmit one pilot sequence every subframe of M OFDM symbol periods.

The above described pilot scheme is optimized for low speeds, and can handle high speeds by taking advantage of the pilots in sub-frames on either side of the current sub-frame via simple time-domain interpolation. For very high speeds or for sub-frames that cannot take advantage of common pilots in an adjacent sub-frame, additional overhead (e.g., an additional OFDM symbol with pilots towards the end of the frame) can be adaptively included for channel estimation.

The present invention encompasses a method for pilot transmission for a transmitter having multiple antennas. The method comprises the steps of transmitting a first pilot sequence during a first symbol period over a first multiple sub-carriers on a first group of antennas, and transmitting a second pilot sequence during a second symbol period over a second multiple sub-carriers on a second group of antennas. The first and the second groups of antennas only transmit one pilot sequence every subframe of M OFDM symbol periods. In one embodiment, the first group of antennas is the same as the second group of antennas. In another embodiment, the first group of antennas does not transmit pilot sequences when the second group of antennas is transmitting pilot sequences and the second group of antennas does not transmit pilot sequences when the first group of antennas is transmitting pilot sequences.

The present invention additionally encompasses a transmitter comprising a first group of antennas which during a first symbol period transmit a first pilot sequence over multiple sub-carriers. The transmitter additionally comprises a second group of antennas that during a second symbol period transmit a second pilot sequence over multiple sub-carriers. The first and the second groups of antennas only transmit one pilot sequence every subframe of M OFDM symbol periods. The first and the second groups of antennas only transmit one pilot sequence every subframe of M OFDM symbol periods. In one embodiment, the first group of antennas is the same as the second group of antennas. In another embodiment, the first group of antennas does not transmit pilot sequences when the second group of antennas is transmitting pilot sequences and wherein the second group of antennas does not transmit pilot sequences when the first group of antennas is transmitting pilot sequences.

The present invention encompasses a method for pilot transmission. The method comprises the steps of transmitting a pilot sequence during an OFDM symbol period over multiple sub-carriers on one or more antennas, wherein the pilot sequence is transmitted on substantially every $K_D$ sub-carriers during the OFDM symbol. The pilot sequence is transmitted during the OFDM symbol period on sub-carriers located adjacent to a DC sub-carrier, where the pilot sequence transmitted on adjacent sub-carriers repeats the pilot sequence that should be present on the DC sub-carrier.

The present invention additionally encompasses a method for pilot transmission. The method comprises the steps of transmitting a pilot sequence during an OFDM symbol period over multiple sub-carriers on one or more antennas, wherein the pilot sequence is transmitted on substantially every $K_D$ sub-carriers during the OFDM symbol. A pilot sequence is transmitted during a previous OFDM symbol period on a sub-carrier adjacent to a band edge where the pilot sequence transmitted on the sub-carrier adjacent to the band edge repeats the pilot sequence which should be present on the sub-carrier just outside the band edge.

Turning now to the drawings, where like numerals designate like components, FIG. 1 is a block diagram of communication system 100 that utilizes pilot transmissions. Communication system 100 utilizes a next generation OFDM or multicarrier based architecture. The architecture may also include the use of spreading techniques such as Multi-Carrier Code Division Multiple Access (MC-CDMA), Multi-Carrier Direct Sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments communication system 100 may utilize other wideband cellular communication system protocols such as, but not limited to, Time Division Multiple Access (TDMA) or direct sequence CDMA.

As one of ordinary skill in the art will recognize, during operation of an OFDM system, multiple sub-carriers (e.g., 601 sub-carriers, 768, sub-carriers, etc.) are utilized to transmit wideband data. This is illustrated in FIG. 2. As shown in FIG. 2 the wideband channel is divided into many narrow frequency bands (sub-carriers) 201, with data being transmitted in parallel on sub-carriers 201.

Returning to FIG. 1, communication system 100 includes base unit 101 and remote unit 103. Remote unit 103 may also be referred to as a communication unit, User Equipment (UE), or simply a mobile, while base unit 101 may also be referred to as a communication unit or simply Node-B. Base unit 101 comprises a transmitter and receiver that serve a number of remote units within a sector. As known in the art, the entire physical area served by the communication network may be divided into cells, and each cell may comprise one or more sectors. Base unit 101 may employ multiple antennas 109 to serve each sector in order to provide various advanced communication modes (e.g., adaptive beam forming, transmit diversity, transmit Spatial Division Multiple Access (SDMA), multiple stream transmission, etc.). Base unit 101 transmits downlink communication signals 104 to serving remote units on at least a portion of the same resources (time, frequency, or both). Remote unit 103 communicates with base unit 101 via uplink communication signal 106.

It should be noted that while only one base unit and a single remote unit are illustrated in FIG. 1, one of ordinary skill in the art will recognize that typical communication systems comprise many base units in simultaneous communication with many remote units. It should also be noted that while the present invention is described primarily for the case of downlink transmission from one base unit to multiple remote units for simplicity, the invention is also applicable to uplink transmissions from multiple remote units to multiple base units.

As discussed above, pilot assisted modulation is commonly used to aid in many functions such as channel estimation for subsequent demodulation of transmitted signals. With this in mind, base unit 101 transmits known sequences at known time intervals as part of its downlink transmissions. Remote unit 103, knowing the sequence and time interval, utilizes this information in demodulating/decoding the transmissions. Such a pilot transmission scheme is illustrated in FIG. 3. As shown, downlink transmissions 300 from base unit 101 on a particular sub-carrier typically comprise pilot sequence 301 followed by remaining transmission 302. The same or a different sequence can show up one or multiple times during the remaining transmission 302. Thus, base unit 101 comprises pilot channel circuitry 107 that transmits one or more pilot sequences along with data channel circuitry 108 transmitting data. Note that pilot sequence 301 may or may not be mixed with data symbols. It should also be noted that pilot sequence 301 and the remaining transmission 302 may comprise a sub-frame whose structure is repeated at other time intervals. For example, a sub-frame may consist of M OFDM symbols, where the M OFDM symbols contains both pilot and data sequences, and the overall structure of the M OFDM symbols is repeated at various time periods.

It should be noted that although FIG. 3 shows pilot sequence 301 existing at the beginning of a transmission, in various embodiments of the present invention, the pilot channel circuitry may include pilot sequence 301 anywhere within downlink transmission 300, and additionally may be transmitted on a separate channel. Remaining transmission 302 typically comprises transmissions such as, but not limited to, information that the receiver needs to know before performing demodulation/decoding (so called control information) and actual information targeted to the user (user data).

As discussed above, a typical pilot format used in earlier OFDM systems is a "scattered pilot" format with pilots distributed in both time and frequency based on the expected maximum Doppler frequency and maximum delay spread, respectively. Scattered pilots might be viewed as the most general pilot format, but they are fairly difficult to specify.

In order to address this issue, in a first embodiment of the present invention, a pilot scheme is utilized where during a first symbol period (e.g., OFDM symbol period number two) a first pilot sequence is transmitted over multiple sub-carriers on a first group of antennas (e.g., antennas one and two). During a second OFDM symbol period (e.g., OFDM symbol period number seven), a second pilot sequence is transmitted over the multiple sub-carriers on a second group of antennas (e.g., antennas three and four). In general it is possible for an antenna group to contain only one antenna. The first group of antennas does not transmit pilot sequences when the second group of antennas is transmitting pilot sequences. Additionally, the second group of antennas does not transmit pilot sequences when the first group of antennas is transmitting pilot sequences. The first and the second groups of antennas only transmit one pilot sequence during one OFDM symbol period every M symbol periods (i.e., one pilot sequence per sub-frame). Note that a first pilot sequence might contain two distinct sequences which are sent separately from the first group of antennas. Likewise, a second pilot sequence might contain two distinct sequences which are sent separately from the second group of antennas.

FIG. 4 shows a more-detailed view of a pilot transmission scheme. The format is a TDM format, with one of the OFDM symbols in the sub-frame containing all of the pilot symbols. More particularly, as one of ordinary skill in the art will recognize, for a particular sub-channel of one or more sub-carriers, an OFDM frame comprises a plurality of sub-frames, with each sub-frame being composed of M OFDM symbols. A resource block is composed of one or more sub-carriers for N symbols. Thus, in FIG. 4, Nc sub-carriers are utilized to transmit data to a remote unit. The Nc sub-carriers utilize M symbols per sub-frame (e.g., M=7 symbols/sub-frame). FIG. 4 also shows a middle or zero or Direct Current (DC) sub-carrier that typically does not contain data for downlink transmission. Additionally, the first and the second symbol periods that comprise the pilot transmissions from the first and the second groups of antennas are transmitted every sub-frame, where a sub-frame comprises M OFDM symbols.

The above described pilot scheme easily accommodates up to at least four transmit antennas within an OFDM symbol period by either (a) dividing the pilots into four sets and alternating between the antennas or (b) having all antennas transmit on all the pilot sub-carriers, where each transmit antenna sends the same underlying pilot sequence, but with a different phase shift sequence to enable the channel estimates to be separated at the receiver. For transmit antenna m on the kth sub-carrier, the pilot values are given as:

$$S_m(k) = x(k) e^{-j2\pi k (m-1)/P} \quad (1)$$

where x(k) is the sector-specific pilot sequence (e.g., constant magnitude sequence with good properties) that is common to all transmit antennas and P is the cyclic shift index. For the pilot format in FIG. 4 which has a pilot symbol on every other sub-carrier, P=8 would be used for four transmit antennas and P=4 would be used for two transmit antennas. Note that $S_m(k)$ is only defined on the sub-carriers that have a pilot symbol. The advantage of method (b) is that the linear phase shift makes the channels to the multiple transmit antennas orthogonal in the time domain when performing channel estimation at the mobile (i.e., a linear phase shift in the frequency domain is a circular time shift in the time domain).

The above described pilot scheme is optimized for low speeds, and can handle high speeds by taking advantage of the pilots in sub-frames on either side of the current sub-frame via simple time-domain interpolation. For very high speeds or for sub-frames that cannot take advantage of common pilots in an adjacent sub-frame, additional overhead (e.g., an additional OFDM symbol with pilots towards the end of the frame) can be adaptively included for channel estimation. These additional pilots would typically be restricted to the resource blocks or sub-frames requiring the additional pilots, and would not be used by other sub-frames unless the extra pilots were explicitly (dedicated or broadcast control message) or implicitly known to be present (e.g., during a last sub-frame of a radio frame, or due to a signalled UE speed measurement).

It should be noted that the TDM pilot format allows for greatly simplified channel estimation algorithms, and provides a high enough pilot density in the frequency dimension to enable various enhanced estimation algorithms (e.g., track the frequency selectivity of other-cell interference for improved Log-Likelihood Ratio (LLR) generation, perform "denoising" at low Signal to Noise plus Interference Ratio (SINR) by tap thresholding techniques, etc.). In addition, control information can be placed in the same (or adjacent) OFDM symbol as the pilots to allow any mobile unit to very quickly estimate the channel (with a simplified 1-dimensional channel estimator based on either Finite Impulse Response (FIR) or Fast Fourier Transform (FFT) processing) and decode the control information immediately, thereby reducing latency. Reducing latency is an important requirement for various wireless communications systems. TDM control would also allow turning off processing for the remainder of a frame, which could be especially significant for long frames. In other words, a TDM pilot power saving mechanisms, such as decoding the control channel by using the TDM pilots near the control channel and then shutting the receiver off until the next control channel transmission if there is no data for the receiver, can reduce power consumption.

Figure 5:
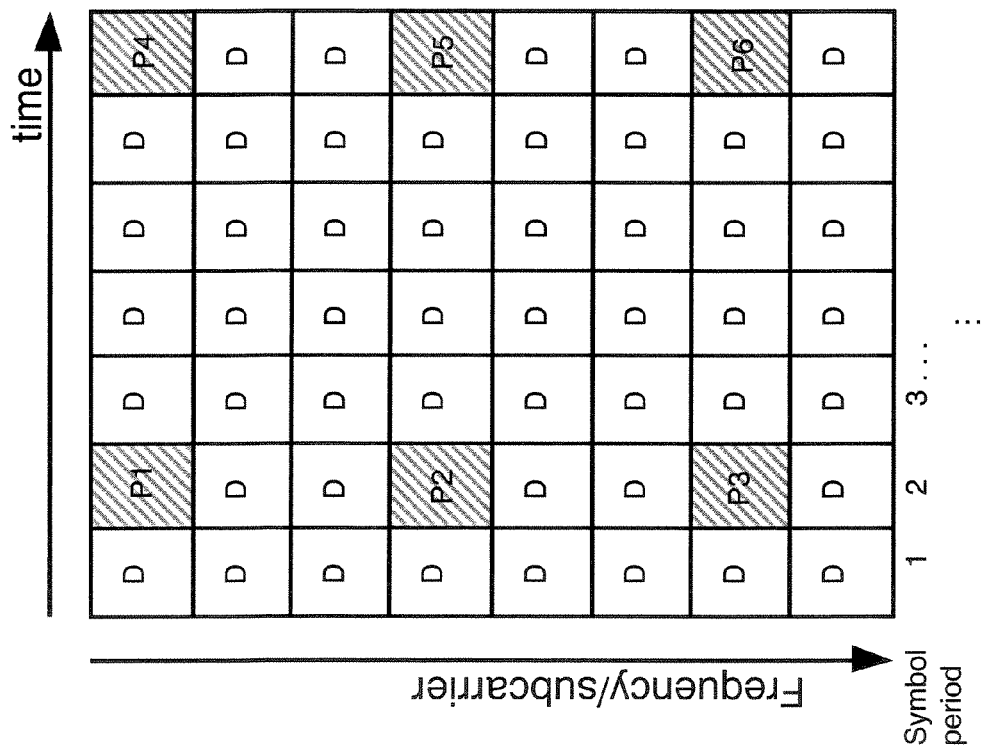
FIG. 5 shows a more-simplified view of a pilot transmission scheme.

FIG. 5 shows a more-simplified view of the pilot transmission scheme, where only a subset of the Nc sub-carriers are shown for simplicity. In a first embodiment of the present invention, four antennas 109 are utilized to transmit the following data/pilot scheme to mobile unit 103. As one of ordinary skill in the art will recognize, all pilot symbols transmitted during a symbol period comprise the pilot sequence with the pilot sequence being transmitted on less than all sub-carriers of the symbol period. The pilot sequence may comprise a Generalized Chirp-like (GCL) sequence, or may simply be cyclically shifted sequences, or any Pseudo-Random (PN) or PN constant amplitude sequence. Additionally, pilot symbols during a particular symbol period will only be broadcast on certain antennas. So for example, in a base station using four antennas, pilot symbols P1, P2, and P3 will be broadcast using antennas 1 and 2 only. Antennas 3 and 4 will broadcast nothing on the subcarriers containing P1, P2, and P3 during those symbol periods. Similarly, symbols P4, P5, and P6 will be broadcast using antennas 3 and 4 only. Antennas 1 and 2 will broadcast nothing on the subcarriers containing P4, P5, and P6 during those symbol periods.

Stated more generally, during a first symbol period a first pilot sequence is transmitted over multiple sub-carriers on a first group of antennas. During a second symbol period, a second pilot sequence is transmitted over the multiple sub-carriers on a second group of antennas. The first group of antennas does not transmit pilot sequences when the second group of antennas is transmitting pilot sequences. Additionally, the second group of antennas does not transmit pilot sequences when the first group of antennas is transmitting pilot sequences. The first and the second groups of antennas only transmit one pilot sequence every M symbol periods (i.e., once every sub-frame). While the above example is given with a same number of antennas in the first and the second groups of antennas, in alternate embodiments of the present invention, one group of antennas may be smaller than (i.e, contain less antennas than) another group of antennas. Additionally, preferably both groups of antennas comprise multiple antennas; however either or both groups of antennas may simply comprise a single antenna.

In the infrequent case that adjacent sub-frames are desired but not present, high performance may be maintained by arranging (via scheduling) not to have high speed users in that sub-frame. Alternatively, the modulation may be restricted to QPSK or more pilots could be added (e.g., in the OFDM symbols next to the two pilot symbols) for additional occasional overhead.

Figure 6:
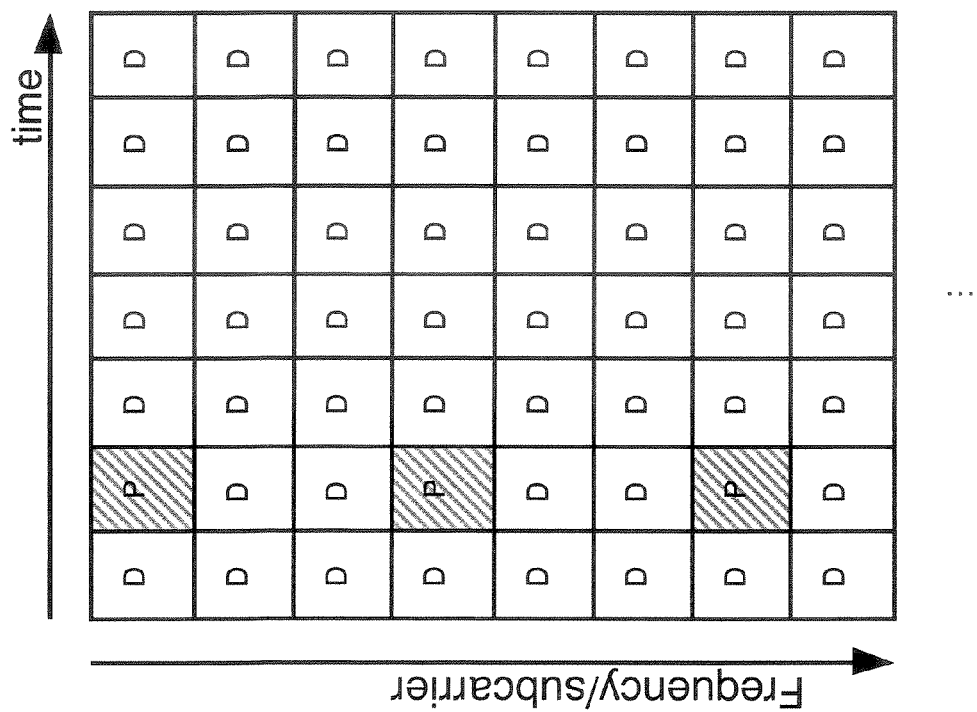
FIG. 6 shows a two antenna version of a pilot transmission scheme.

In the first embodiment of the present invention four base transmit antennas 109 are used in a default deployment. However, if the base is only capable of 1-2 antennas, the pilot overhead can optionally be reduced by removing half the pilots in the pilot format, as shown in FIG. 6. The base capability could be communicated at most once per super frame (a super frame is a collection of many sub-frames), and thus the signalling of the base capabilities (configuration message) is very infrequent. To be functional at very high speeds (or when adjacent sub-frames are not present) a second pilot sequence for antennas 1 and 2 may be added in the second OFDM symbol period pilot symbol. This embodiment is also shown in FIG. 5 where now antennas 1 and 2 transmit pilot sequences on both OFDM symbol period two and OFDM symbol period seven. In other words, antennas 1 and 2 transmit on pilot symbols P1, P2, P3, P4, P5, and P6.

Figure 7:
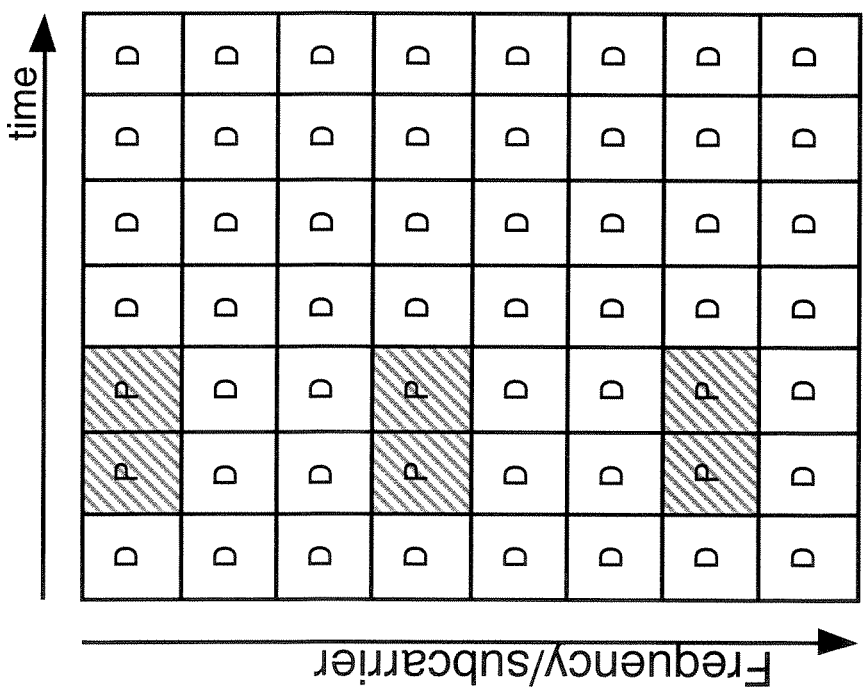
FIG. 7 is an alternate embodiment of the pilot transmission scheme.

The proposed format is TDM (per antenna). If an advanced multiple antenna technique (e.g., cyclic shift diversity) is used for the control, the second pilot symbol may be moved adjacent to the first symbol and TDM control, if desired, as shown in FIG. 7. This scheme is similar to that described above in FIG. 5, except that no data symbols exist between pilot symbols (in time).

Figure 8:
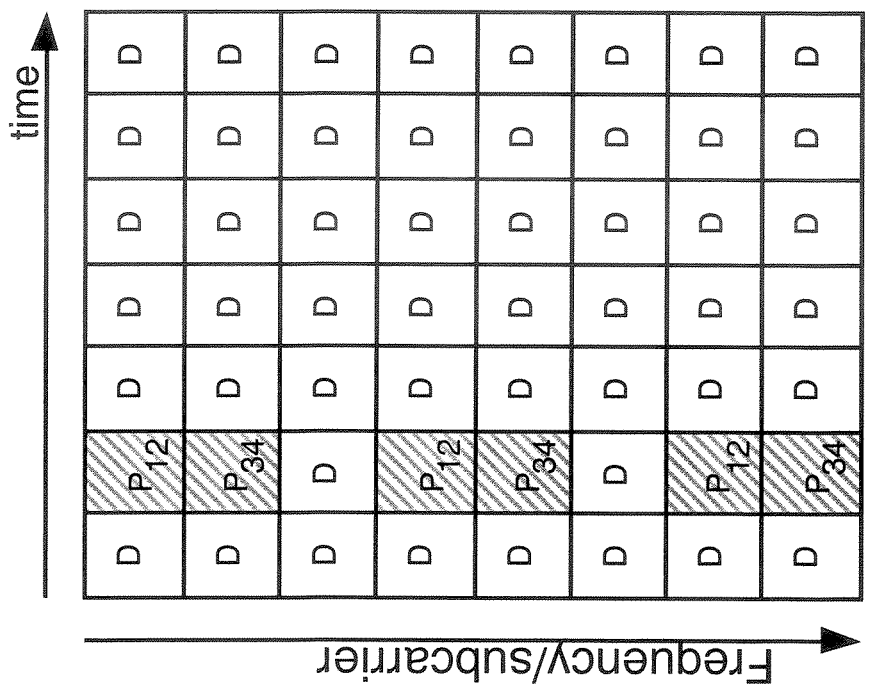
FIG. 8 is a four antenna pilot transmission scheme where all pilot sequences are contained in one OFDM symbol.

In addition, other pilot placements are possible such as moving the pilots for transmit antennas three and four to the same OFDM symbol period as antennas one and two, but on a different set of sub-carriers. This pilot placement is shown in FIG. 8 where $P_{12}$ indicates a pilot for antennas one and two and $P_{34}$ indicates a pilot for antennas three and four. So for this pilot transmission scheme, during an OFDM symbol period a first pilot sequence is transmitted over a first plurality of sub-carriers on a first group of antennas. Additionally, during the OFDM symbol period, a second pilot sequence is transmitted over a second plurality of sub-carriers on a second group of antennas. The first group of antennas transmits nothing on the second plurality of sub-carriers when the second group of antennas is transmitting pilot sequences. The second group of antennas transmits nothing on the first plurality of sub-carriers when the first group of antennas is transmitting pilot sequences. The first and the second groups of antennas only transmit one pilot sequence every M symbol periods (i.e., once every sub-frame).

Figure 9:
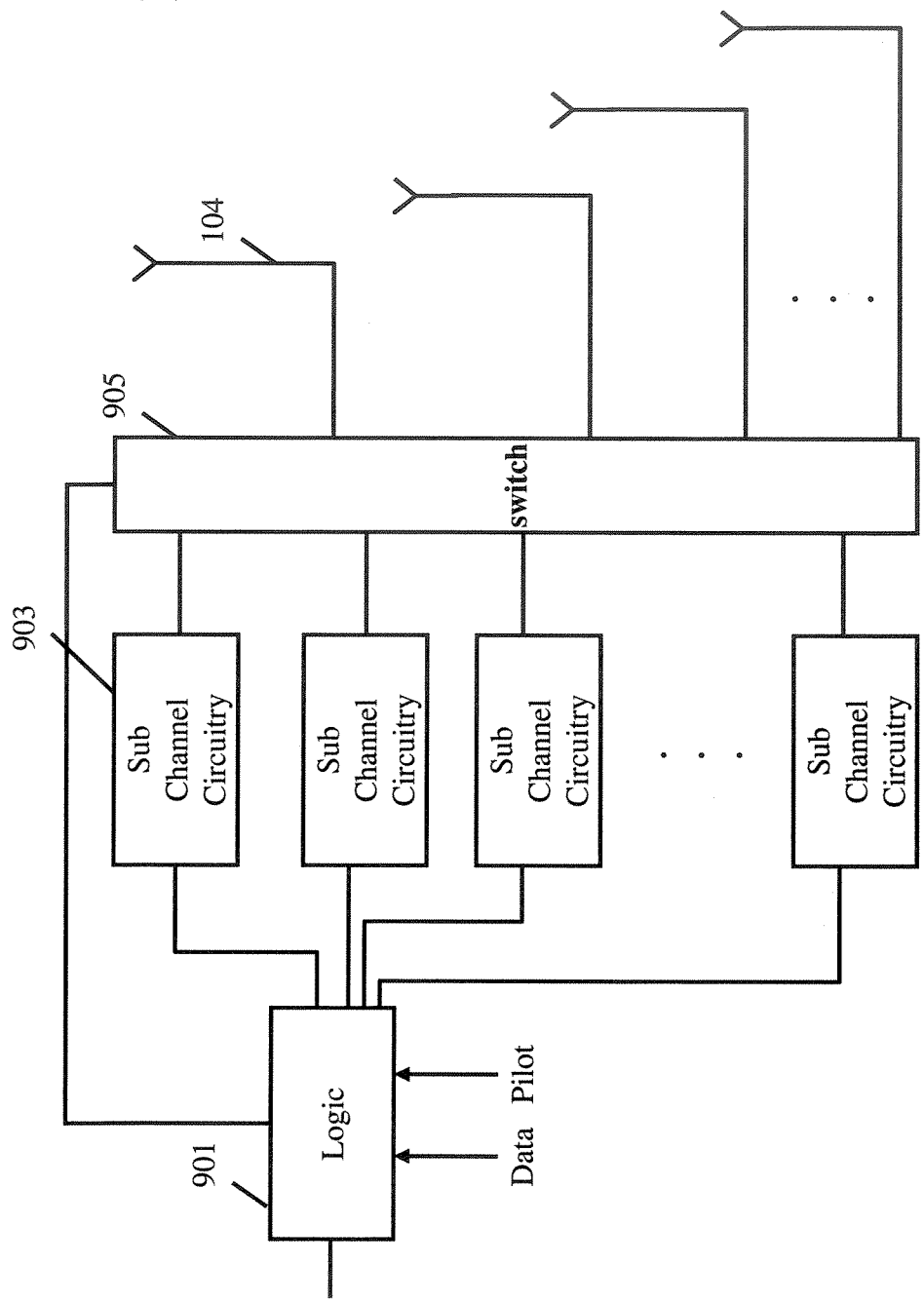
FIG. 9 is a simple block diagram of a base station.

FIG. 9 is a simple block diagram of base station 101. As shown, base station 101 comprises sub-channel circuitry 903, switch 905, and antennas 109 (only one sub-channel circuitry and antenna are labeled). A sub-channel may comprise one or more sub-carriers. If a sub-channel comprises more than one sub-carrier, the sub-carriers comprising the sub-channel may be adjacent or non-adjacent. Logic circuitry 901 is provided to control the output to sub-channel circuitry 903 and to control switch 905. Operation of base station 101 occurs as shown in FIG. 10.

Figure 10:
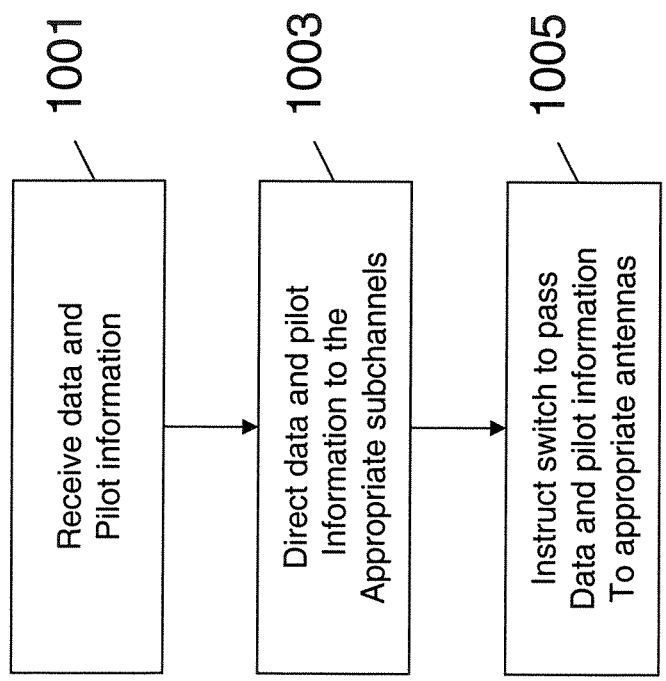
FIG. 10 is a flow chart showing operation of a base station.

FIG. 10 is a flow chart showing operation of base station 101. The logic flow begins at step 1001 where data and pilot information is received by logic circuitry 901. Logic circuitry 901 determines the symbol period and directs both the data and the pilot to the appropriate sub-channels (step 1003) based on the symbol period. For example, if a particular sub-channel is to transmit pilot information during a particular symbol period, then the pilot information would be directed to that sub-channel during that symbol period. At step 1005 logic circuitry 901 instructs switch 905 to pass pilot or data information from sub-channel circuitry 903 to the appropriate antennas 109. For example, if pilot information is only to be broadcast on a subgroup of antennas, then switch 905 will pass the pilot information to the subgroup.

As discussed above, in a first embodiment, during a first OFDM symbol period a first pilot sequence is transmitted over multiple sub-carriers on a first group of antennas. During a second OFDM symbol period, a second pilot sequence is transmitted over the multiple sub-carriers on a second group of antennas. The first group of antennas does not transmit pilot sequences when the second group of antennas is transmitting pilot sequences. Additionally, the second group of antennas does not transmit pilot sequences when the first group of antennas is transmitting pilot sequences.

In a second embodiment of the present invention, during an OFDM symbol period a first pilot sequence is transmitted over a first plurality of sub-carriers on a first group of antennas. Additionally, during the OFDM symbol period, a second pilot sequence is transmitted over a second plurality of sub-carriers on a second group of antennas. The first group of antennas does not transmit pilot sequences on the second plurality of sub-carriers when the second group of antennas is transmitting pilot sequences. Additionally, the second group of antennas does not transmit pilot sequences on the first plurality of sub-carriers when the first group of antennas is transmitting pilot sequences.

A typical receiver will comprise a single antenna to receive a first pilot sequence during a first symbol period over multiple sub-carriers that was transmitted on a first group of antennas. The receiver will receive a second pilot sequence during a second symbol period over the multiple sub-carriers that was transmitted on a second group of antennas. As discussed, the first group of antennas does not transmit pilot sequences when the second group of antennas is transmitting pilot sequences and the second group of antennas does not transmit pilot sequences when the first group of antennas is transmitting pilot sequences.

Given that there is a pilot on every third sub-carrier with the pilot format in FIG. 5., a pilot symbol may land on the DC (zero) sub-carrier. This is undesirable since typical wireless communication systems do not send any pilot or data information on the DC sub-carrier. To improve channel estimation performance when this happens, a pilot symbol is encoded for the DC sub-carrier (i.e., using the k value of the DC sub-carrier, denoted $k_{dc}$) as given in equation (1) and then this pilot symbol is repeated at sub-carrier $k_{dc}-1$ and also $k_{dc}+1$ in place of the data symbol. For example. for transmit antenna m on sub-carrier $k_{dc}-1$ where $k_{dc}$ is the sub-carrier index of the DC sub-carrier, the pilot value is given as:

$$S_m(k_{dc}-1)=x(k_{dc})e^{-j2\pi k_{dc}(m-1)/P} \qquad (1)$$

Figure 11:
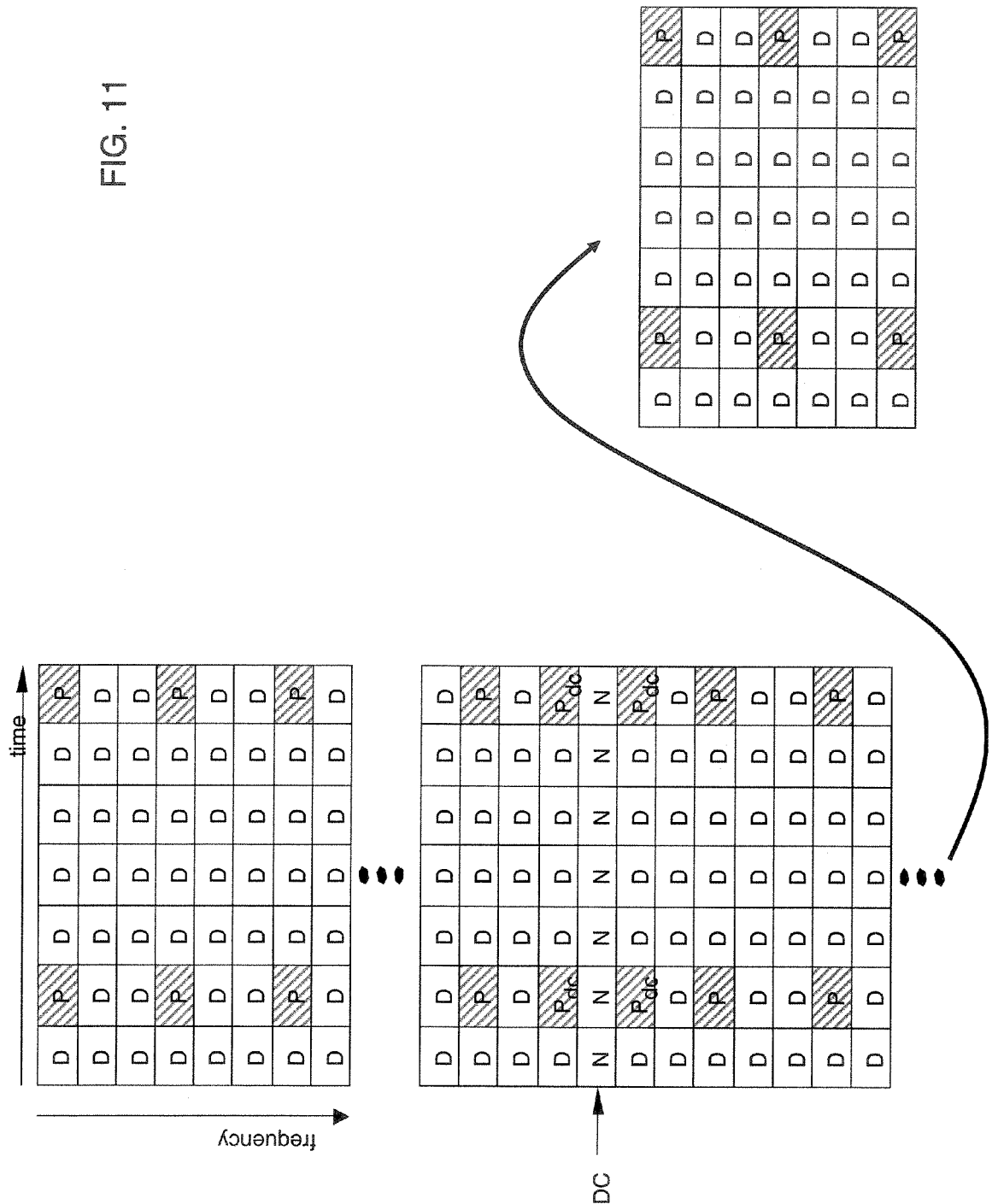
FIG. 11 shows a pilot transmission scheme that improves channel estimation around the DC sub-carrier.

One example of how pilot symbols on the sub-carriers adjacent to the DC sub-carrier are allocated is shown in FIG. 11. for the pilot format shown in FIG. 5. Pilot transmissions are similar to those described above, however, the pilot symbols are allocated on every third sub-carrier and this allocation strategy ends up with a pilot on the DC sub-carrier. In typical OFDM systems, no data or pilots are sent on the DC sub-carrier, yet it is still desirable to have a virtual pilot at the DC location in order to enable good performance with simple channel estimators. In order to do this, the pilot which would/should be present at DC, labeled $P_{dc}$, is repeated at the sub-carriers adjacent to the DC sub-carrier. Then the receiver would average the received data at the adjacent sub-carriers to DC in order to create a virtual received pilot symbol at DC. An example of $P_{dc}$ would be to us $k=k_{dc}$ in (1).

So to enable better channel estimation at DC, during an OFDM symbol period a pilot sequence is transmitted over multiple sub-carriers on one or more antennas wherein the pilot sequence is transmitted on substantially every $K_D$ sub-carriers during the OFDM symbol (e.g., $K_D=3$). The pilot sequence contains pilots symbols that are transmitted on sub-carriers located adjacent to a DC sub-carrier. The pilot sequence transmitted on adjacent sub-carriers to DC repeats the pilot sequence which should be present at the DC sub-carrier, or that would have appeared on DC. The pilot sequence could be the $P_{dc}$ value mentioned above.

Figure 12:
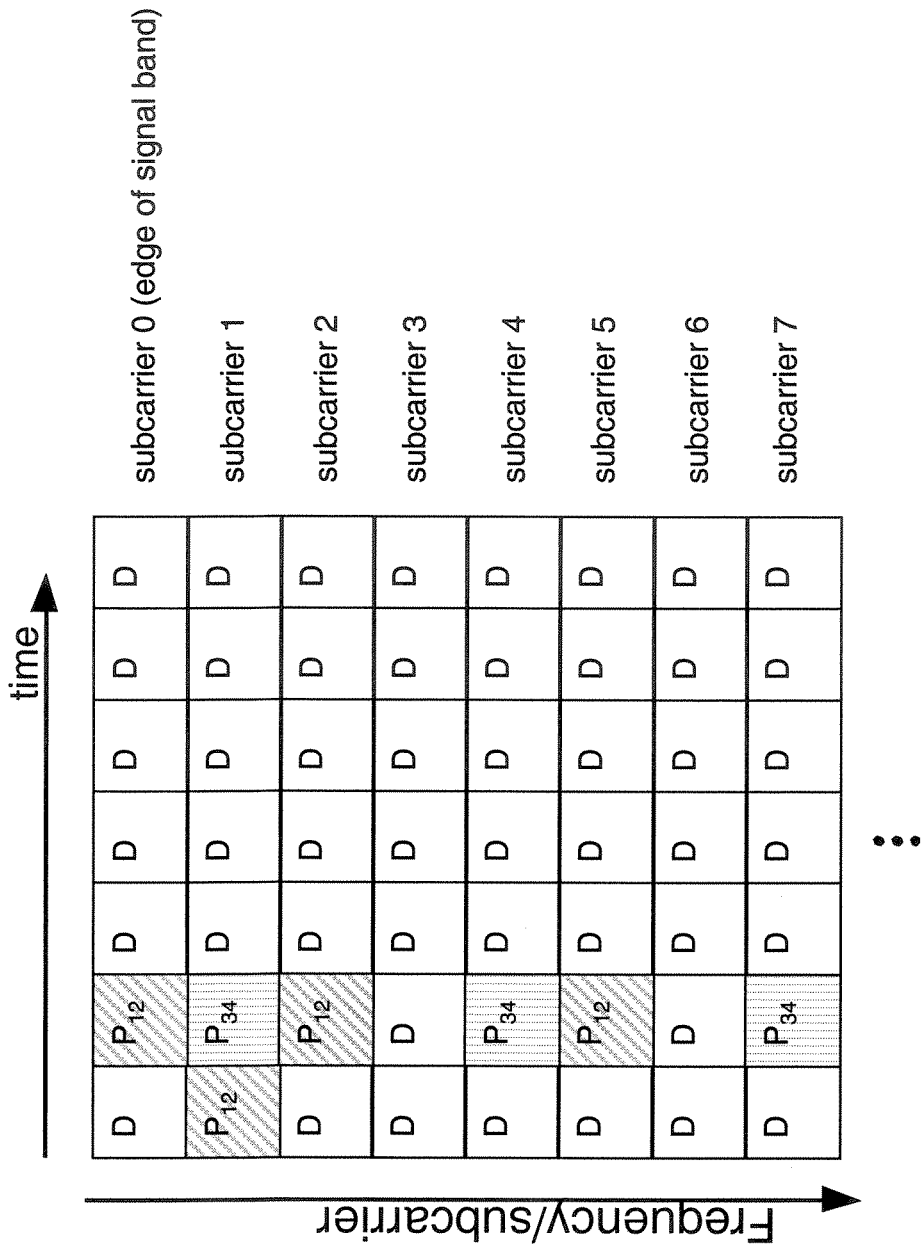
FIG. 12 shows a pilot transmission scheme that improves channel estimation at the edge of the sub-carriers.

Similar to the just mentioned method for improving channel estimation around the DC sub-carrier, FIG. 12 shows a pilot format that improves channel estimation at the band edge. Here for simplicity, the sub-carrier at the edge of the signal bandwidth is labeled as sub-carrier 0 (note that the sub-carrier indexing in FIG. 12 is different than that of FIG. 4). The pilot sequence for antennas one and two are meant to be on every third sub-carrier starting from the sub-carrier just outside the signal band or band edge (also be referred to as sub-carrier-1) through the end of the band. However, nothing is transmitted at sub-carrier-1 because it is outside of the band assignment. To create a virtual pilot at sub-carrier-1 for antennas one and two, the pilot symbol which is designed for sub-carrier-1 (e.g., using k=−1 in (1)), is repeated on the first OFDM symbol on sub-carrier 1 and on the second OFDM symbol on sub-carrier 0. Then the virtual received pilot symbol at sub-carrier-1 is created by combining the received signal at these two pilot locations (e.g., by using linear interpolation). A similar procedure can be used at the other end of the band for the pilot sequence for antennas three and four. For example, say the last sub-carrier is sub-carrier K-1, then a pilot sequence may be desired for antennas three and four at sub-carrier K just outside the signal band or band edge. To accomplish this, the pilot symbol for sub-carrier K (e.g., using k=K in (1)), can be repeated on OFDM symbol one on sub-carrier K-2 and on OFDM symbol 2 on sub-carrier K-1. Then the virtual received pilot symbol on sub-carrier K is created by combining the received signal at these two pilot locations.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for pilot transmission in an Orthogonal Frequency Division Multiplexed (OFDM) system for a base unit having multiple transmit antennas, the method comprising the steps of:
    transmitting via a transmitter in a communication system, a first pilot sequence at a first time during a first symbol period over a first multiple sub-carriers on a first group of antennas; and
    transmitting via the transmitter a second pilot sequence at a second time during a second symbol period over a second same or differing multiple subcarriers on a second group of antennas, wherein the first and the second groups of antennas only transmit one pilot sequence every subframe of M OFDM symbol periods;
    wherein the step of transmitting the first pilot sequence comprises the step of transmitting a same first pilot sequence from each of the antennas in the first group of antennas during the first symbol period;
    wherein the first group of antennas does not transmit on the second multiple subcarriers during the second symbol period when the second group of antennas are transmitting pilot sequences and wherein the second group of antennas does not transmit on the first multiple subcarriers during the first symbol period when the first group of antennas are transmitting pilot sequences; and
    wherein the first symbol period is different from the second symbol period and the first pilot sequence is different from the second pilot sequence.

2. The method of claim 1 wherein the first symbol period is the first or the second OFDM symbol period in a subframe, and the second symbol period is towards the end of the subframe.

3. The method of claim 1 wherein the step of transmitting the first pilot sequence comprises the step of transmitting the first pilot sequence from each of the antennas in the first group of antennas, on every $K_D$ sub-carriers during the first symbol period, where $K_D$ is an integer greater than one.

4. The method of claim 3 further comprising the step of transmitting the pilot sequence during the first symbol period on sub-carriers located adjacent to a direct current (DC) sub-carrier, where the pilot sequence transmitted on adjacent sub-carriers repeats a pilot sequence that should be present on the DC sub-carrier.

5. The method of claim 3 further comprising the step of transmitting a pilot sequence during a previous symbol period on a sub-carrier adjacent to a band edge where the pilot sequence transmitted on the sub-carrier adjacent to the band edge repeats the pilot sequence which should be present on a sub-carrier just outside the band edge.

6. The method of claim 3 wherein $K_D=6$.

7. The method of claim 1 wherein the step of transmitting the first pilot sequence over the first multiple sub-carriers and the step of transmitting the second pilot sequence over the second multiple sub-carriers comprise the step of transmitting pilot sequences on less than all sub-carriers of the symbol period.

8. The method of claim 1 further comprising the step of transmitting control information in at least a portion of the subcarriers not used for pilot transmission in both the first and second symbol period, wherein the second symbol period is adjacent to the first symbol period.

9. The method of claim 1 wherein the step of transmitting the first and the second pilot sequences comprises the step of transmitting cyclically shifted sequences, Generalized Chirp-like (GCL) sequences, or pseudo-random sequences.

10. The method of claim 1 wherein the step of transmitting the first pilot sequence during a first symbol period over a first multiple sub-carriers on a first group of antennas comprises the step of transmitting a pilot sequence from a first antenna of the first group of antennas and the pilot sequence cyclically shifted in the time domain from a second antenna of the first group of antennas.

11. The method of claim 1 wherein the step of transmitting the first pilot sequence during a first symbol period over a first multiple sub-carriers on a first group of antennas comprises the step of transmitting a pilot sequence from a first antenna of the first group of antennas and the pilot sequence modified by a phase shift sequence corresponding to a cyclic shift index from a second antenna of the first group of antennas.

12. The method of claim 1 wherein the first symbol period is a first OFDM symbol period in a subframe, and the second symbol period is a second OFDM symbol period in the subframe.

13. The method of claim 1 wherein the step of transmitting the first pilot sequence further comprises the step of alternating the pilot transmission from each of the antennas in the first group of antennas over the first multiple sub-carriers during the first symbol period.

14. The method of claim 1 wherein the step of transmitting the first pilot sequence comprises the step of transmitting the first pilot sequence on the first group of antennas during the first symbol period in a first subframe and transmitting a third pilot sequence on the first group of antennas during the first symbol period in a second subframe,
    wherein the first pilot sequence is different from the third pilot sequence and the first subframe is different from the second subframe.

15. A base unit in an Orthogonal Frequency Division Multiplexed (OFDM) system comprising:
    a first group of antennas that during a first symbol period transmit a same pilot sequence over a first multiple sub-carriers; and
    a second group of antennas that during a second symbol period transmit a second pilot sequence over a second same or differing multiple sub-carriers, wherein the first and the second group of antennas only transmit one pilot sequence every subframe of M OFDM symbol periods;

wherein the first group of antennas does not transmit on the second multiple subcarriers during the second symbol period when the second group of antennas are transmitting pilot sequences and wherein the second group of antennas does not transmit on the first multiple subcarriers during the first symbol period when the first group of antennas are transmitting pilot sequences; and wherein the first symbol period is different from the second symbol period and the first pilot sequence is different from the second pilot sequence.

16. The base unit of claim 15 wherein transmitting the first pilot sequence comprises transmitting one or more distinct sequences comprising the first pilot sequence, wherein at least one of the one or more distinct sequences is transmitted on substantially every $K_D$ sub-carriers during the symbol period where $K_D$ is an integer greater than one.

17. The base unit of claim 15 wherein pilot sequences are transmitted on less than all sub-carriers of the symbol period.

18. A method for pilot reception at a remote unit in an Orthogonal Frequency Division Multiplexed (OFDM) system, the method comprising the steps of:

receiving by a receiver a first pilot sequence at a first time, during a first symbol period over a first multiple sub-carriers, the first pilot sequence transmitted by all antennas within a first group of antennas; and receiving by the receiver, a second pilot sequence at a second time, during a second symbol period over a second multiple sub-carriers, the second pilot sequence transmitted on a second group of antennas, wherein the first and the second group of antennas only transmit one pilot sequence every subframe of M OFDM symbol periods, wherein the first group of antennas does not transmit on the second multiple subcarriers during the second symbol period when the second group of antennas are transmitting pilot sequences and wherein the second group of antennas does not transmit on the first multiple subcarriers during the first symbol period when the first group of antennas are transmitting pilot sequences and wherein the first symbol period is different from the second symbol period and the first pilot sequence is different from the second pilot sequence.

19. The method of claim 18 further comprising the steps of:

receiving control information in at least a portion of the subcarriers not used for pilot transmission in the same OFDM symbol period as the first OFDM symbol period and an adjacent OFDM symbol period decoding the control information based on a channel estimate obtained from the first pilot sequence.

* * * * *